United States Patent
Sakurai

(10) Patent No.: US 7,903,082 B2
(45) Date of Patent: Mar. 8, 2011

(54) CONTROL DEVICE AND CONTROL METHOD, AND PLANAR LIGHT SOURCE AND CONTROL METHOD OF PLANAR LIGHT SOURCE

(75) Inventor: Hisao Sakurai, Saitama (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 12/166,756

(22) Filed: Jul. 2, 2008

(65) Prior Publication Data

US 2009/0009105 A1 Jan. 8, 2009

(30) Foreign Application Priority Data

Jul. 3, 2007 (JP) ................................. 2007-174846

(51) Int. Cl.
*G09G 3/36* (2006.01)
(52) U.S. Cl. ......... 345/102; 315/224; 315/246; 315/299; 315/360
(58) Field of Classification Search .............. 315/209 R, 315/224, 246, 291, 299, 307, 360; 345/102
See application file for complete search history.

(56) References Cited

U.S. PATENT DOCUMENTS

| 6,831,621 | B2 * | 12/2004 | Nakano ........................... 345/87 |
| 7,573,447 | B2 * | 8/2009 | Oh et al. ......................... 345/87 |
| 2001/0052891 | A1 * | 12/2001 | Yoshihara et al. ............ 345/102 |
| 2002/0005861 | A1 | 1/2002 | Lewis | |
| 2007/0108846 | A1 | 5/2007 | Ashdown | |

FOREIGN PATENT DOCUMENTS

| JP | 2004-336944 | 11/2004 |
| JP | 2006-31977 | 2/2006 |

* cited by examiner

*Primary Examiner* — Thuy Vinh Tran
(74) *Attorney, Agent, or Firm* — Frommer Lawrence & Haug LLP; William S. Frommer

(57) ABSTRACT

A control device for controlling driving of an LED includes: a driving section driving the LED, the driving section being formed including a switching element; a control value obtaining section obtaining a control value of n+m bits; and a controlling section controlling the driving of the LED by the driving section on a basis of the control value of the n+m bits obtained by the control value obtaining section such that a number of times of turning on the switching element in a predetermined period is controlled by a control value of n higher-order bits, an ON time at one of the times of turning on the switching element is controlled by a control value of m lower-order bits, and ON times of the switching element excluding the ON time at the one time of turning on the switching element are a predetermined time.

13 Claims, 6 Drawing Sheets

CONTROL DEVICE AND CONTROL METHOD, AND PLANAR LIGHT SOURCE AND CONTROL METHOD OF PLANAR LIGHT SOURCE

CROSS REFERENCES TO RELATED APPLICATIONS

The present invention contains subject matter related to Japanese Patent Application JP 2007-174846 filed in the Japan Patent Office on Jul. 3, 2007, the entire contents of which being incorporated herein by reference.

BACKGROUND OF THE INVENTION

1. Field of the Invention

The present invention relates to a control device and a control method, and a planar light source and a control method of the planar light source, and particularly to a control device and a control method, and a planar light source and a control method of the planar light source that are suitable for use in driving an LED (Light Emitting Diode).

2. Description of the Related Art

In related art, techniques for controlling an LED by current driving are widely used (see Japanese Patent Laid-Open No. 2005-310999, for example).

For example, an LED driving circuit 1 using a buck converter as shown in FIG. 1 controls power supplied to an LED. Such a buck converter is already commercialized, and is itself used widely without being limited to the driving of an LED.

The driving of an LED 11 in the LED driving circuit 1 shown in FIG. 1 is performed by the detection of a current value by a resistance 21 and PWM control by a current controlling PWM (Pulse Width Modulation) 31. LED power control for controlling the brightness of the LED 11, that is, the control of power supplied to the LED 11 when the current controlling PWM 31 is ON is performed by a brightness controlling PWM 32. Incidentally, it is needless to say that power control (brightness control) on the LED 11 can be performed by current control.

An OSC (oscillator) 33 generates a signal of fundamental frequency, and supplies the signal to the current controlling PWM 31 and the brightness controlling PWM 32.

The current controlling PWM 31 controls the turning on/off of a FET 12 on the basis of a result of comparison of the value of a voltage occurring across the resistance 21 with a reference voltage generated by a current control voltage supplying DAC (Current DAC (digital to analog converter)) 36, the result of comparison being supplied from a comparator (comp) 34.

FIG. 2 shows a common example of the waveform of gate current of the FET 12, that is, the switching operation of the FET 12 and the waveform of current flowing to the LED 11.

When the FET 12 is ON, that is, when the gate current of the FET 12 flows, a current I1 flows through the LED 11, the FET 12, and the resistance 21 from VDD1 via a reactance 13. A charge is accumulated in the reactance 13 during a period t1 when the FET 12 is ON. A capacitor 14 is for smoothing power.

The comparator (comp) 34 supplies the current controlling PWM 31 with a result of comparison of the value of voltage generated across the resistance 21 with the reference voltage generated by the current control voltage supplying DAC 36. The current controlling PWM 31 controls the FET 12 to turn on the FET 12 at the time of a start of one switching cycle. The current controlling PWM 31 maintains the ON state of the FET 12 while the value of the voltage generated across the resistance 21 is lower than the reference voltage generated by the current control voltage supplying DAC 36. The current controlling PWM 31 controls the FET 12 to turn off the FET 12 when the value of the voltage generated across the resistance 21 becomes higher than the reference voltage generated by the current control voltage supplying DAC 36.

In a period t2 in which the FET 12 is off, the charge accumulated in the reactance 13 is discharged, and a diode 15 acts to generate a current I2. Thus the current corresponding to the accumulated charge flows through the LED 11. Due to this series of operations, the current to the LED 11 is maintained in a state of equilibrium.

The brightness controlling PWM 32 determines an ON duty for PWM control on the basis of an n-bit PWM adjustment value obtained from an operating input unit not shown in the figure or an external device or the like by a PWM adjustment value obtaining unit 35, and outputs a signal for ON/OFF control of the FET 12.

Specifically, as shown by an LED current waveform of FIG. 3, when n-bit control (for example gradation control in 1024 steps when n=10) is performed, the brightness controlling PWM 32 outputs a signal for performing ON/OFF control of the FET 12 so that the ON operation of the FET 12 as described with reference to FIG. 2 is performed in predetermined steps. For example, the operation of turning on the FET 12 for the period t1 on the basis of a result of detection of a current value by the resistance 21 is repeated until an 800th step of the 10-bit gradation, that is, the 1024 steps, whereas the FET 12 is controlled to be off in the other 224 steps.

Specifically, the brightness controlling PWM 32 supplies an ON signal (1) to a logic circuit (logical sum) 37 for a period corresponding to 800 steps of the 1024 gradations, for example, as described above, that is, for a period of 800 steps of the 1024 steps of a PWM cycle, and supplies an OFF signal (0) to the logic circuit 37 for a period of the other 224 steps. The current controlling PWM 31 supplies an ON signal (1) to the logic circuit 37 for the period t1 in each step and supplies an OFF signal (0) for the remaining period t2 on the basis of the signal output from the comparator 34. The FET 12 is turned on when the current controlling PWM 31 and the brightness controlling PWM 32 both output the ON signals (1).

SUMMARY OF THE INVENTION

When the accuracy of PWM control in the LED driving circuit 1 as shown in FIG. 1 is desired to be increased, it suffices, in a simple case, to increase the number of steps by increasing PWM bit gradations, that is, increasing the value of n in the n-bit control. However, the PWM control in the LED driving circuit 1 is performed counting switching cycles of the buck converter, that is, performed by a ratio of an ON time to one PWM cycle (so-called ON duty). When PWM bit gradations are increased, the PWM cycle becomes longer, and therefore responsivity is impaired. Thus, LED brightness control may not be performed at high speed.

Incidentally, rather than increasing the number of steps by increasing the value of n in the n-bit control, it is possible to perform dimming by current control, that is, perform dimming by adjusting the reference voltage generated by the current control voltage supplying DAC 36 and thereby adjusting the period t1 described with reference to FIG. 2 with a high number of gradations. However, because the LED varies in light emission wavelength depending on the current value, dimming by current control is not desirable when the LED is used as a backlight light source in a display device such as a television receiver, for example.

It is conceivable that in addition to increasing the number of steps by increasing the value of n in the n-bit control, the switching speed of the buck converter may be increased for a purpose of shortening the PWM cycle. However, there is a limit to the speed of switching operation, and a product including a buck converter having a very high switching speed is more likely to cause unwanted radiation due to switching noise.

The present invention has been made in view of such a situation. It is desirable to be able to increase the accuracy of PWM control without impairing responsivity.

A control device according to an embodiment of the present invention is a control device for controlling driving of an LED, the control device including: a driving section driving the LED, the driving section being formed including a switching element; a control value obtaining section obtaining a control value of n+m bits; and a controlling section controlling the driving of the LED by the driving section on a basis of the control value of the n+m bits obtained by the control value obtaining section such that a number of times of turning on the switching element in a predetermined period is controlled by a control value of n higher-order bits, an ON time at one of the times of turning on the switching element is controlled by a control value of m lower-order bits, and ON times of the switching element excluding the ON time at the one time of turning on the switching element are a predetermined time.

The controlling section can further include: a first ON signal generating section generating an ON signal at a duty ratio based on the control value of the n higher-order bits of the control value of the n+m bits obtained by the control value obtaining section, with the predetermined time as one cycle; a detecting section detecting a value of current flowing through the LED; a comparing section comparing a result of detection by the detecting section with a predetermined value; a second ON signal generating section generating an ON signal for a period from a start of a switching cycle of the switching element to a time when the value of current flowing through the LED reaches a current value determined by the predetermined value on a basis of a result of comparison by the comparing section; and a switching element controlling section supplying an ON signal to the switching element when the first ON signal generating section and the second ON signal generating section are both generating the ON signals. In the controlling section, the predetermined value compared by the comparing section with the result of detection by the detecting section can be a controlled value controlled by the m lower-order bits in timing corresponding to one of the times of turning on the switching element the number of which times is controlled by the n higher-order bits, and be a reference value in timings corresponding to the other times of turning on the switching element.

The controlling section can further include: a controlled value supplying section supplying the controlled value controlled by the m lower-order bits as the predetermined value to be compared by the comparing section with the result of detection by the detecting section; a reference value supplying section supplying the reference value as the predetermined value to be compared by the comparing section with the result of detection by the detecting section; and a selecting section selecting one of the controlled value supplied by the controlled value supplying section and the reference value supplied by the reference value supplying section as a value to be supplied to the comparing section. In the controlling section, the selecting section can supply the controlled value supplied by the controlled value supplying section to the comparing section in timing corresponding to one of the times of turning on the switching element the number of which times is controlled by the n higher-order bits, and supply the reference value supplied by the reference value supplying section to the comparing section in timings corresponding to the other times of turning on the switching element.

The predetermined time can be a time corresponding to the n bits of switching cycles of the switching element.

A control method according to an embodiment of the present invention is a control method of a control device for controlling driving of an LED, the control method including the steps of: obtaining a control value of n+m bits; controlling a number of times of turning on a switching element included in a driving circuit for driving the LED in a predetermined period by a control value of n higher-order bits of the obtained control value of the n+m bits; and controlling an ON time at one of the times of turning on the switching element by a control value of m lower-order bits, and performing control such that ON times of the switching element excluding the ON time at the one time of turning on the switching element are a predetermined time.

A planar light source device according to an embodiment of the present invention is a planar light source device for emitting light by LED, the planar light source device including: an LED; a driving section driving the LED, the driving section being formed including a switching element; a control value obtaining section obtaining a control value of n+m bits; and a controlling section controlling the driving of the LED by the driving section on a basis of the control value of the n+m bits obtained by the control value obtaining section such that a number of times of turning on the switching element in a predetermined period is controlled by a control value of n higher-order bits, an ON time at one of the times of turning on the switching element is controlled by a control value of m lower-order bits, and ON times of the switching element excluding the ON time at the one time of turning on the switching element are a predetermined time.

A plurality of above-described LEDs, a plurality of above-described driving sections, a plurality of above-described control value obtaining sections, and a plurality of above-described controlling sections can be provided, the LEDs can be arranged in a planar form, and the plurality of controlling section can obtain different control values by the plurality of control value obtaining section, and control the driving of the LEDs by the driving section on a basis of the different control values so as to make the plurality of LEDs emit light at different brightness levels.

A control method of a planar light source according to an embodiment of the present invention is a control method of a planar light source for emitting light by LED, the control method including the steps of: obtaining a control value of n+m bits; controlling a number of times of turning on a switching element included in a driving circuit for driving the LED in a predetermined period by a control value of n higher-order bits of the obtained control value of the n+m bits; and controlling an ON time at one of the times of turning on the switching element by a control value of m lower-order bits, and performing control such that ON times of the switching element excluding the ON time at the one time of turning on the switching element are a predetermined time.

A liquid crystal display device according to an embodiment of the present invention includes: a liquid crystal panel having a color filter substrate and a liquid crystal layer; a backlight having an LED, the backlight being disposed so as to be opposed to the liquid crystal panel; and a control device for controlling the backlight. The control device includes: a driving section driving the LED, the driving section being formed including a switching element; a control value obtaining section obtaining a control value of n+m bits; and a controlling section controlling the driving of the LED by the driving section on a basis of the control value of the n+m bits obtained by the control value obtaining section such that a number of times of turning on the switching element in a predetermined period is controlled by a control value of n higher-order bits, an ON time at one of the times of turning on the switching element is controlled by a control value of m lower-order bits, and ON times of the switching element excluding the ON time at the one time of turning on the switching element are a predetermined time.

The controlling section further includes: a first ON signal generating section generating an ON signal at a duty ratio based on the control value of the n higher-order bits of the control value of the n+m bits obtained by the control value obtaining section, with the predetermined time as one cycle; a detecting section detecting a value of current flowing through the LED; a comparing section comparing a result of detection by the detecting section with a predetermined value; a second ON signal generating section generating an ON signal for a period from a start of a switching cycle of the switching element to a time when the value of current flowing through the LED reaches a current value determined by the predetermined value on a basis of a result of comparison by the comparing section; and a switching element controlling section supplying an ON signal to the switching element when the first ON signal generating section and the second ON signal generating section are both generating the ON signals. In the controlling section, the predetermined value compared by the comparing section with the result of detection by the detecting section is a controlled value controlled by the m lower-order bits in timing corresponding to one of the times of turning on the switching element the number of which times is controlled by the n higher-order bits, and is a reference value in timings corresponding to the other times of turning on the switching element.

The controlling section further includes: a controlled value supplying section supplying the controlled value controlled by the m lower-order bits as the predetermined value to be compared by the comparing section with the result of detection by the detecting section; a reference value supplying section supplying the reference value as the predetermined value to be compared by the comparing section with the result of detection by the detecting section; and a selecting section for selecting one of the controlled value supplied by the controlled value supplying section and the reference value supplied by the reference value supplying section as a value to be supplied to the comparing section. In the controlling section, the selecting section supplies the controlled value supplied by the controlled value supplying section to the comparing section in timing corresponding to one of the times of turning on the switching element the number of which times is controlled by the n higher-order bits, and supplies the reference value supplied by the reference value supplying section to the comparing section in timings corresponding to the other times of turning on the switching element.

The predetermined time can be a time corresponding to the n bits of switching cycles of the switching element.

In an embodiment of the present invention, a control value of n+m bits is obtained, a number of times of turning on a switching element included in a driving circuit for driving an LED in a predetermined period is controlled by a control value of n higher-order bits of the obtained control value of the n+m bits, and an ON time at one of the times of turning on the switching element is controlled by a control value of m lower-order bits, and control is performed such that ON times of the switching element excluding the ON time at the one time of turning on the switching element are a predetermined time.

The control device may be an independent device, or may be a block performing an LED driving and controlling process in an information processing device, a television receiver, a liquid crystal display device or the like.

As described above, according to an embodiment of the present invention, an LED can be driven, and in particular, a number of times of turning on a switching element in a predetermined period is controlled by a control value of n higher-order bits of an obtained control value of n+m bits, an ON time at one of the times of turning on the switching element is controlled by a control value of m lower-order bits, and control is performed such that ON times of the switching element excluding the ON time at the one time of turning on the switching element are a predetermined time. It is thus possible to increase gradations of control without impairing responsivity.

DETAILED DESCRIPTION OF THE PREFERRED EMBODIMENTS

Preferred embodiments of the present invention will hereinafter be described. Correspondences between constitutional requirements of the present invention and embodiments described in the specification or the drawings are illustrated as follows. This description is to confirm that embodiments supporting the present invention are described in the specification or the drawings. Therefore, even when there is an embodiment described in the specification or a drawing but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Figure 4:
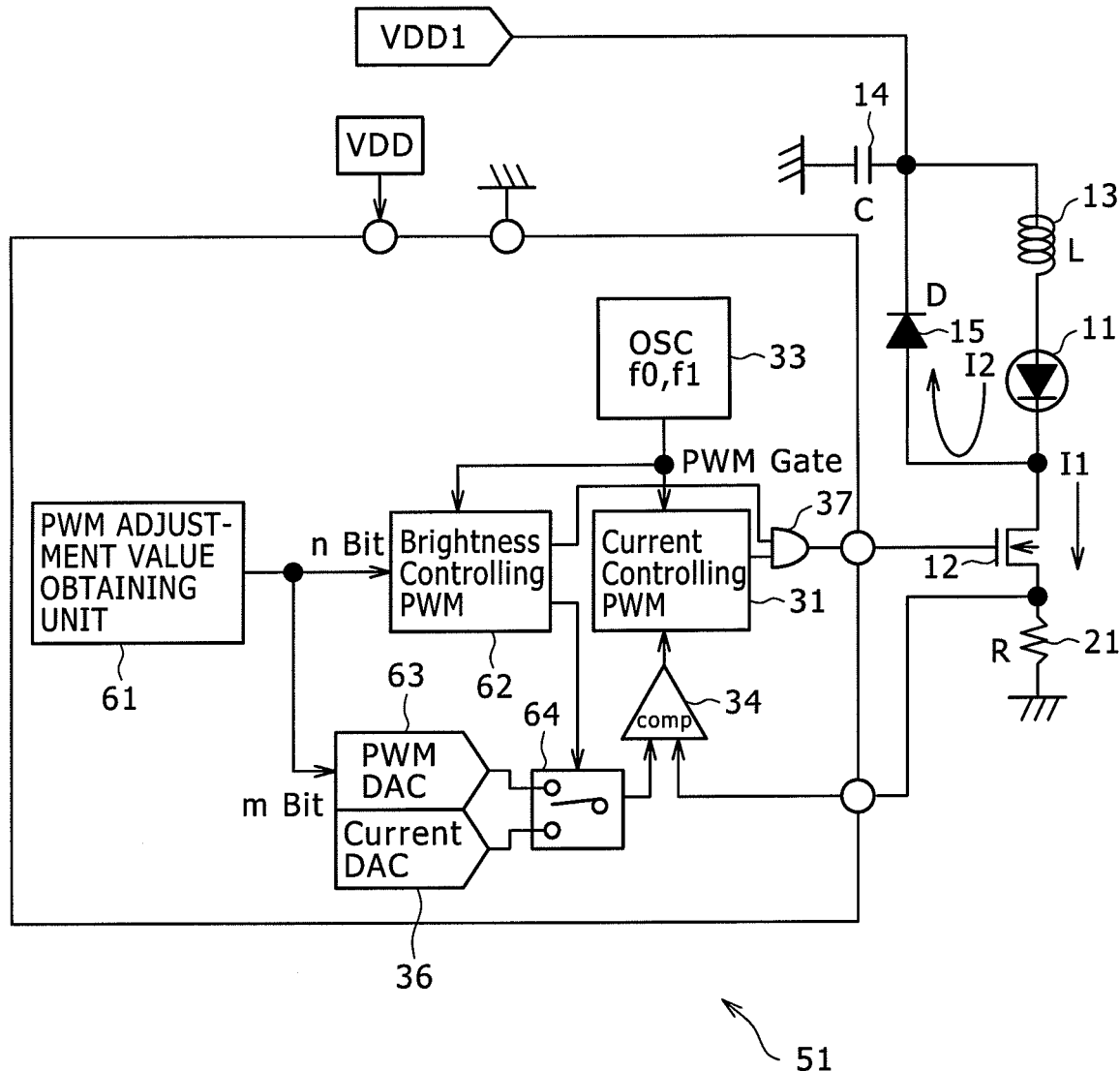
FIG. 4 is a diagram of assistance in explaining an LED driving circuit to which an embodiment of the present invention is applied.
Figure 5:
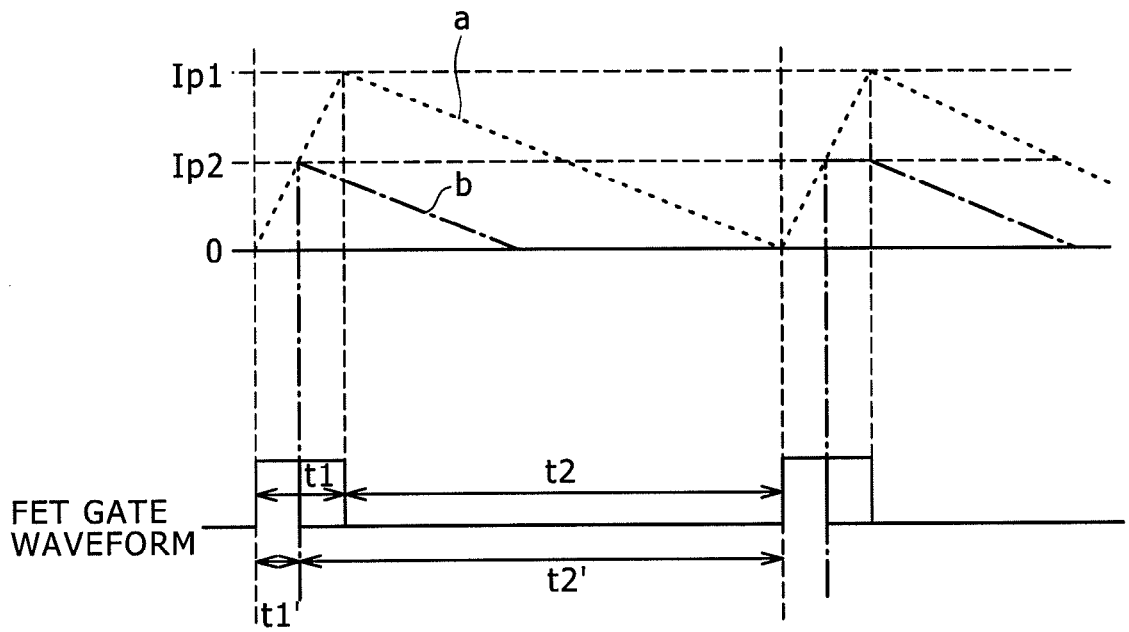
FIG. 5 is a diagram showing the waveform of gate current of a FET in the LED driving circuit of FIG. 4.

A control device according to an embodiment of the present invention is a control device (for example an LED driving circuit 51 in FIG. 4) for controlling driving of an LED, the control device including: driving means (for example a buck converter circuit shown in FIG. 4) for driving the LED, the driving means being formed including a switching element (for example a FET 12 in FIG. 4); control value obtaining means (for example a PWM adjustment value obtaining unit 61 in FIG. 4) for obtaining a control value of n+m (n and m are each a positive integer) bits; and controlling means (for example a resistance 21, a current controlling PWM 31, a comparator 34, a logic circuit 37, a current control voltage supplying DAC 36, a brightness controlling PWM 62, a PWM control voltage supplying DAC 63, and a switch 64 in FIG. 4) for controlling the driving of the LED by the driving means on a basis of the control value of the n+m bits obtained by the control value obtaining means such that a number of times of turning on the switching element in a predetermined period (for example one PWM cycle) is controlled by a control value of n higher-order bits, an ON time (for example t1' in FIG. 5) at one of the times of turning on the switching element is controlled by a control value of m lower-order bits, and ON times of the switching element excluding the ON time at the one time of turning on the switching element are a predetermined time (for example t1 in FIG. 5).

The controlling means can further include: first ON signal generating means (for example the brightness controlling PWM 62 in FIG. 4) for generating an ON signal at a duty ratio based on the control value of the n higher-order bits of the control value of the n+m bits obtained by the control value obtaining means, with the predetermined time as one cycle; detecting means (for example the resistance 21 in FIG. 4) for detecting a value of current flowing through the LED; comparing means (for example the comparator 34 in FIG. 4) for comparing a result of detection by the detecting means with a predetermined value; second ON signal generating means (for example the current controlling PWM 31 in FIG. 4) for generating an ON signal for a period from a start of a switching cycle of the switching element to a time when the value of current flowing through the LED reaches a current value determined by the predetermined value on a basis of a result of comparison by the comparing means; and switching element controlling means (for example the logic circuit 37 in FIG. 4) for supplying an ON signal to the switching element when the first ON signal generating means and the second ON signal generating means are both generating the ON signals. In the controlling means, the predetermined value compared by the comparing means with the result of detection by the detecting means can be a controlled value controlled by the m lower-order bits in timing corresponding to one of the times of turning on the switching element the number of which times is controlled by the n higher-order bits, and be a reference value in timings corresponding to the other times of turning on the switching element.

The controlling means can further include: controlled value supplying means (for example the PWM control voltage supplying DAC 63 in FIG. 4) for supplying the controlled value controlled by the m lower-order bits as the predetermined value to be compared by the comparing means with the result of detection by the detecting means; reference value supplying means (for example the current control voltage supplying DAC 36 in FIG. 4) for supplying the reference value as the predetermined value to be compared by the comparing means with the result of detection by the detecting means; and selecting means (for example the switch 64 in FIG. 4) for selecting one of the controlled value supplied by the controlled value supplying means and the reference value supplied by the reference value supplying means as a value to be supplied to the comparing means. In the controlling means, the selecting means can supply the controlled value supplied by the controlled value supplying means to the comparing means in timing corresponding to one of the times of turning on the switching element the number of which times is controlled by the n higher-order bits, and supply the reference value supplied by the reference value supplying means to the comparing means in timings corresponding to the other times of turning on the switching element.

Figure 7:
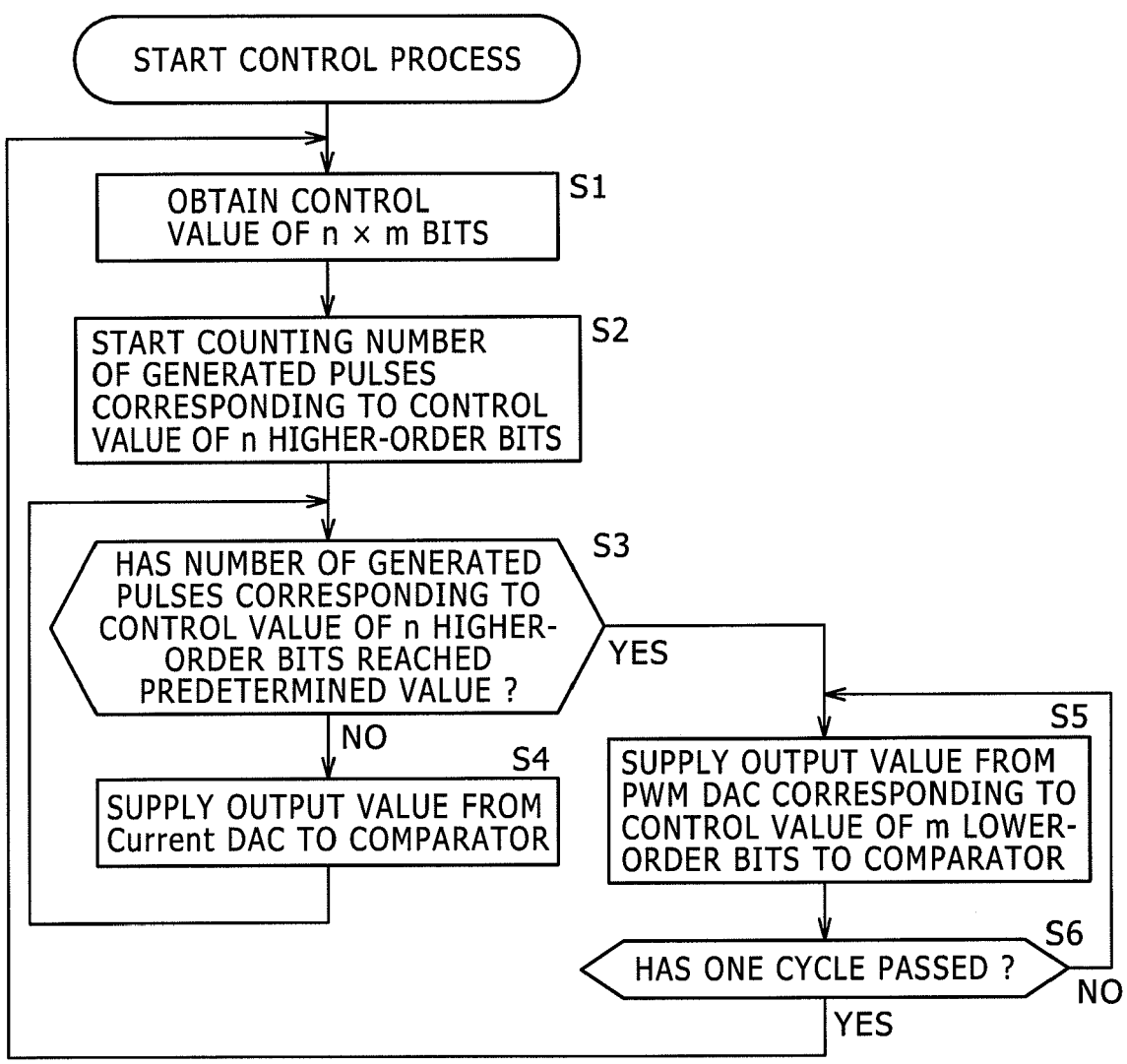
FIG. 7 is a flowchart of assistance in explaining a control process.

A control method according to an embodiment of the present invention is a control method of a control device (for example an LED driving circuit 51 in FIG. 4) for controlling driving of an LED, the control method including the steps of: obtaining a control value of n+m (n and m are each a positive integer) bits (for example the process of step S1 in FIG. 7); controlling a number of times of turning on a switching element (for example a FET 12 in FIG. 4) included in a driving circuit (for example a buck converter circuit shown in FIG. 4) for driving the LED in a predetermined period (for example one PWM cycle) by a control value of n higher-order bits of the obtained control value of the n+m bits (for example the process of step S2 in FIG. 7); and controlling an ON time (for example t1' in FIG. 5) at one of the times of turning on the switching element by a control value of m lower-order bits, and performing control such that ON times of the switching element excluding the ON time at the one time of turning on the switching element are a predetermined time (for example t1 in FIG. 5) (for example the process of steps S3 to S6 in FIG. 7).

Figure 8:
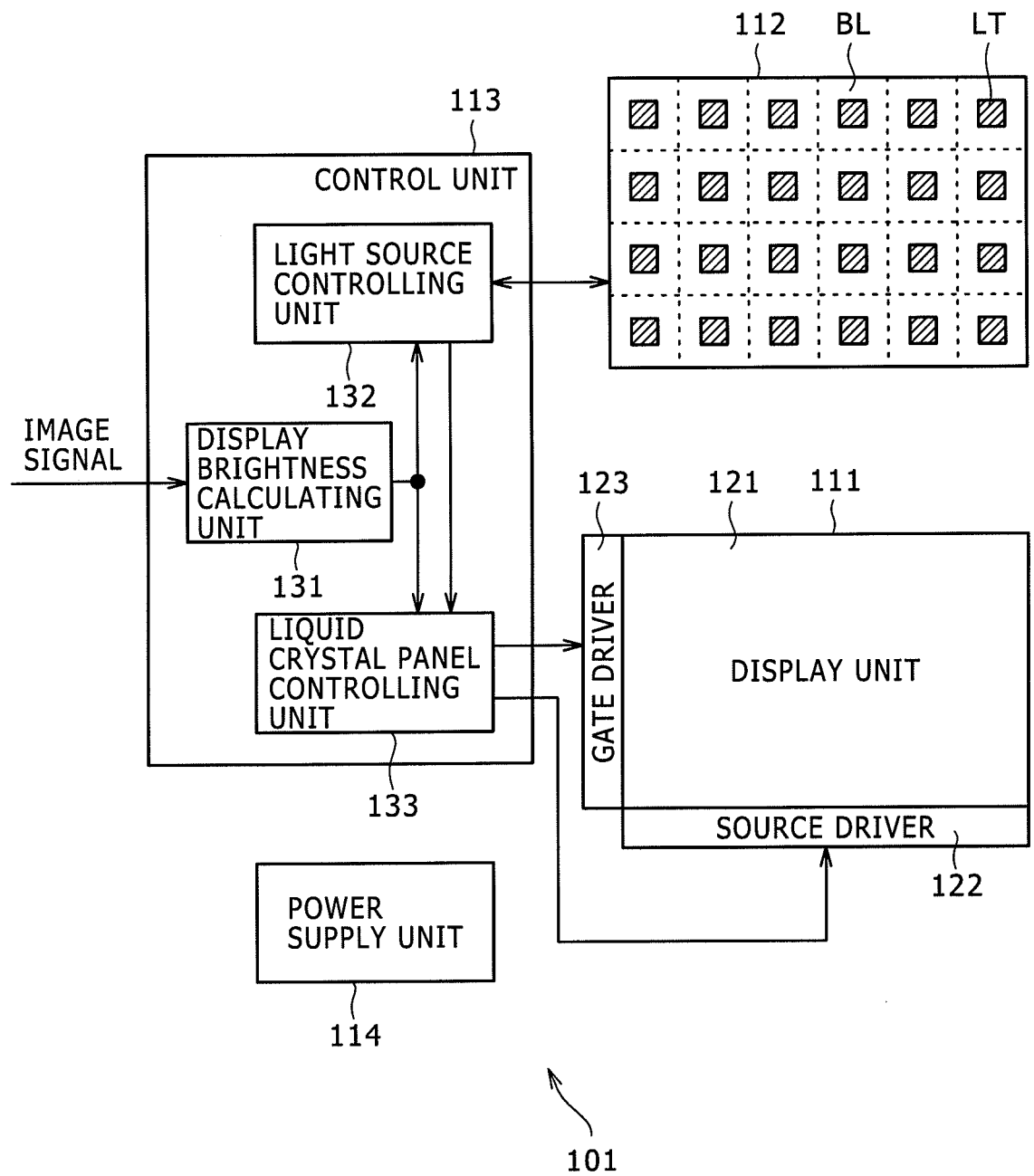
FIG. 8 is a diagram of assistance in explaining a liquid crystal display device as an example to which the LED driving circuit of FIG. 4 is applied.

A planar light source device according to an embodiment of the present invention is a planar light source device (for example a backlight 112 and a light source controlling unit 132 in FIG. 8) for emitting light by LED, the planar light source device including: an LED (for example an LED 11 in FIG. 4); driving means (for example a buck converter circuit shown in FIG. 4) for driving the LED, the driving means being formed including a switching element (for example a FET 12 in FIG. 4); control value obtaining means (for example a PWM adjustment value obtaining unit 61 in FIG. 4) for obtaining a control value of n+m (n and m are each a positive integer) bits; and controlling means (for example a resistance 21, a current controlling PWM 31, a comparator 34, a logic circuit 37, a current control voltage supplying DAC 36, a brightness controlling PWM 62, a PWM control voltage supplying DAC 63, and a switch 64 in FIG. 4) for controlling the driving of the LED by the driving means on a basis of the control value of the n+m bits obtained by the control value obtaining means such that a number of times of turning on the switching element in a predetermined period (for example one PWM cycle) is controlled by a control value of n higher-order bits, an ON time (for example t1' in FIG. 5) at one of the times of turning on the switching element is controlled by a control value of m lower-order bits, and ON times of the switching element excluding the ON time at the one time of turning on the switching element are a predetermined time (for example t1 in FIG. 5).

A plurality of above-described LEDs, a plurality of above-described driving means, a plurality of above-described control value obtaining means, and a plurality of above-described controlling means can be provided, the LEDs can be arranged in a planar form, and the plurality of controlling means can obtain different control values by the plurality of control value obtaining means, and control the driving of the LEDs by the driving means on a basis of the different control values so as to make the plurality of LEDs emit light at different brightness levels.

A control method according to an embodiment of the present invention is a control method of a planar light source (for example a backlight 112 and a light source controlling unit 132 in FIG. 8) for emitting light by LED, the control method including the steps of: obtaining a control value of n+m (n and m are each a positive integer) bits (for example the process of step S1 in FIG. 7); controlling a number of times of turning on a switching element (for example a FET 12 in FIG. 4) included in a driving circuit (for example a buck converter circuit shown in FIG. 4) for driving the LED in a predetermined period (for example one PWM cycle) by a control value of n higher-order bits of the obtained control value of the n+m bits (for example the process of step S2 in FIG. 7); and controlling an ON time (for example t1' in FIG. 5) at one of the times of turning on the switching element by a control value of m lower-order bits, and performing control such that ON times of the switching element excluding the ON time at the one time of turning on the switching element are a predetermined time (for example t1 in FIG. 5) (for example the process of steps S3 to S6 in FIG. 7).

Preferred embodiments of the present invention will hereinafter be described with reference to the drawings.

Incidentally, parts corresponding to parts in related art are identified by the same reference numerals, and description thereof will be omitted as appropriate.

Figure 1:
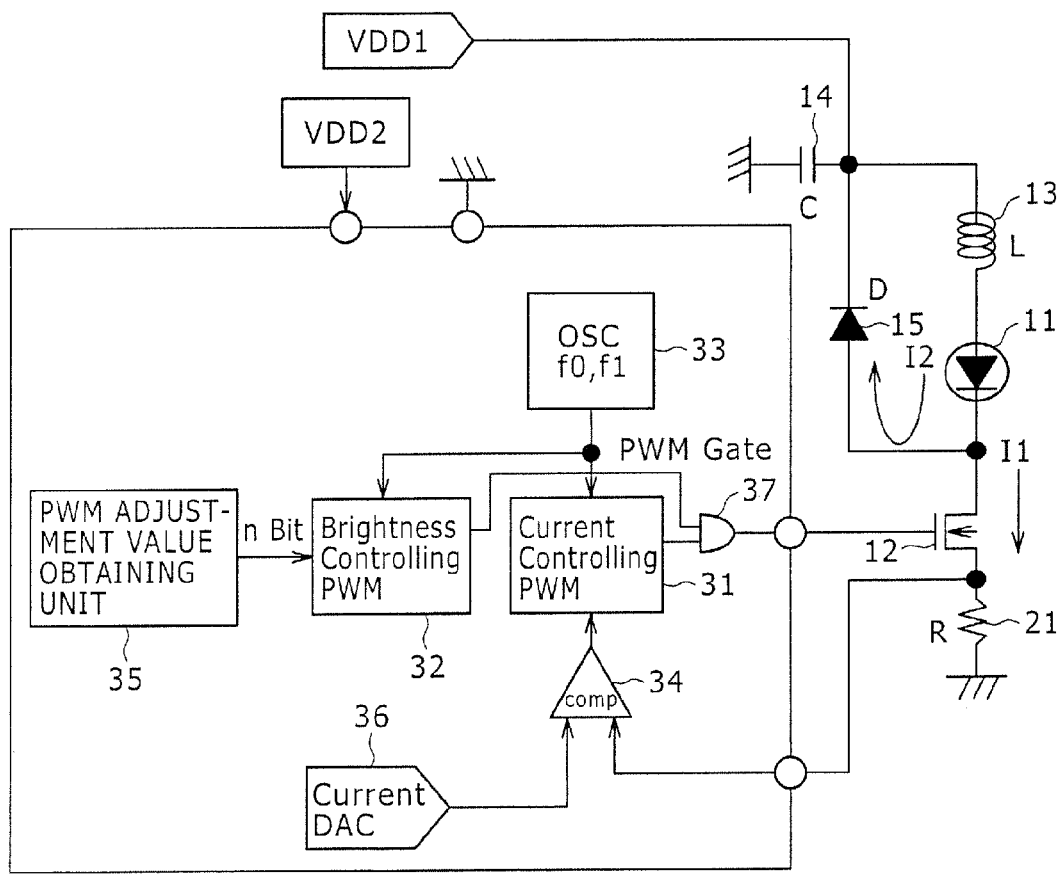
FIG. 1 is a diagram of assistance in explaining a LED driving circuit in related art.

An LED driving circuit 51 in FIG. 4 basically has a similar configuration to that of the LED driving circuit 1 described with reference to FIG. 1 except that the LED driving circuit 51 is provided with a PWM adjustment value obtaining unit 61 in place of the PWM adjustment value obtaining unit 35, provided with a brightness controlling PWM (Bright Control PWM) 62 in place of the brightness controlling PWM 32, and newly provided with a PWM control voltage supplying DAC (PWM DAC) 63 and a switch 64.

The PWM adjustment value obtaining unit 61 obtains a PWM adjustment value of (n+m) bits from an operating input unit not shown in FIG. 4 or an external device or the like. The PWM adjustment value obtaining unit 61 then supplies the n higher-order bits to the brightness controlling PWM 62 and supplies the m lower-order bits to the PWM control voltage supplying DAC 63.

The brightness controlling PWM 62 determines an ON duty for PWM control on the basis of the n-bit PWM adjustment value supplied from the PWM adjustment value obtaining unit 61, and outputs a signal for ON/OFF control of a FET 12. In addition, the brightness controlling PWM 62 controls the switch 64 to supply a reference voltage generated by a current control voltage supplying DAC 36 to a comparator 34 until the number of generated pulses corresponding to a control value of the n higher-order bits reaches a predetermined value, and to supply a controlled voltage value supplied from the PWM control voltage supplying DAC 63 to the comparator 34 when the number of generated pulses corresponding to the control value of the n higher-order bits has reached the predetermined value.

On the basis of the m-bit PWM adjustment value supplied from the PWM adjustment value obtaining unit 61, the PWM control voltage supplying DAC 63 sets the controlled voltage value that is set independently of the reference voltage generated by the current control voltage supplying DAC 36 and which is a voltage value equal to or lower than the reference voltage. The PWM control voltage supplying DAC 63 then supplies the controlled voltage value to the switch 64.

Under control of the brightness controlling PWM 62, the switch 64 supplies the comparator 34 with one of the reference voltage generated by the current control voltage supplying DAC 36 and the controlled voltage value supplied from the PWM control voltage supplying DAC 63.

When the FET 12 is on, a current I1 flows through an LED 11, the FET 12, and a resistance 21 from VDD1 via a reactance 13. A charge is accumulated in the reactance 13 during a period when the FET 12 is on. A capacitor 14 is for smoothing power.

The comparator (comp) 34 compares the value of voltage generated across the resistance 21 with the reference voltage generated by the current control voltage supplying DAC 36 or the controlled voltage generated by the PWM control voltage supplying DAC 63. The comparator 34 supplies a result of the comparison to a current controlling PWM 31. The current controlling PWM 31 controls the FET 12 to turn on the FET 12 at the time of a start of one switching cycle. The current controlling PWM 31 maintains the ON state of the FET 12 while the value of the voltage generated across the resistance 21 is lower than the reference voltage or the controlled voltage. The current controlling PWM 31 controls the FET 12 to turn off the FET 12 when the value of the voltage generated across the resistance 21 becomes higher than the reference voltage or the controlled voltage.

Figure 2:
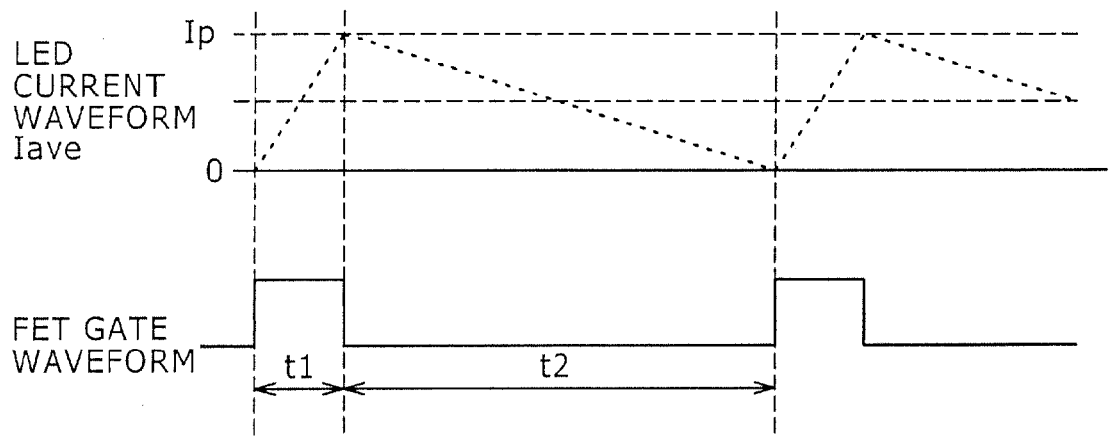
FIG. 2 is a diagram showing the waveform of gate current of a FET in the LED driving circuit of FIG. 1.
Figure 3:
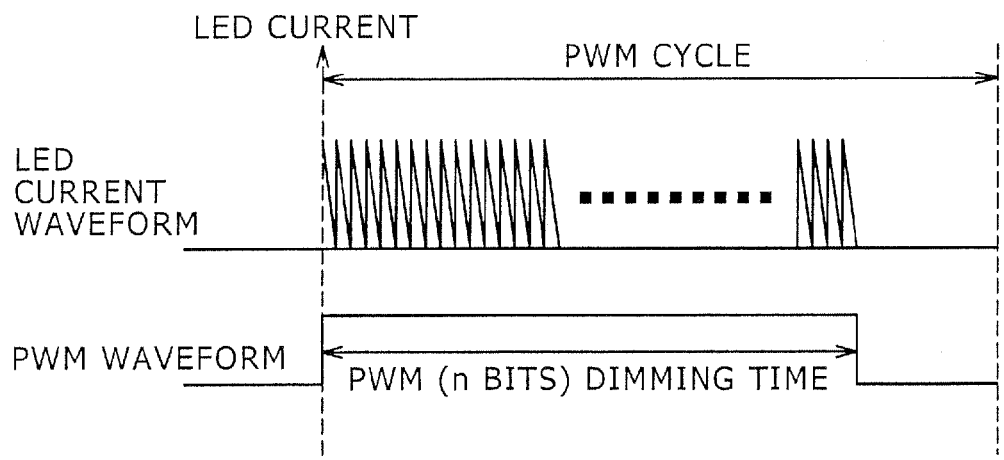
FIG. 3 is a diagram of assistance in explaining an ON duty of PWM control in the LED driving circuit of FIG. 1.

The brightness controlling PWM 62 outputs a signal for performing ON/OFF control of the FET 12 to a logic circuit 37 so that the ON operation of the FET 12 as described with reference to FIG. 2 is performed in predetermined steps in correspondence with gradation control by the n higher-order bits of the (n+m) bits (for example gradation control in 1024 steps when n=10). In one of the steps in which the FET 12 is turned on in correspondence with the gradation control by the n higher-order bits, for example a last step, the brightness controlling PWM 62 controls the switch 64 to supply the controlled voltage value supplied from the PWM control voltage supplying DAC 63 to the comparator 34. Specifically, for example, when the n higher-order bits of the (n+m) bits are 10 bits, and a PWM adjustment value for performing gradation control such that the FET 12 is on in 800 steps of the 1024 steps is supplied from the PWM adjustment value obtaining unit 61, the brightness controlling PWM 62 controls the switch 64 to supply the reference voltage generated by the current control voltage supplying DAC 36 to the comparator 34 until a 799th step, and controls the switch 64 to supply the controlled voltage value supplied from the PWM control voltage supplying DAC 63 to the comparator 34 in an 800th step.

FIG. 5 shows a common example of the waveform of gate current of the FET 12 in the LED driving circuit 51, that is, the switching operation of the FET 12 and the waveform of current flowing to the LED 11.

When the reference voltage generated by the current control voltage supplying DAC 36 is supplied from the switch 64 to the comparator 34, the FET 12 is ON for a period t1 on the basis of the value of the reference voltage. Then, in a period t2 in which the FET 12 is OFF, the charge accumulated in the reactance 13 is discharged, and a diode 15 acts to generate a current I2. Thus the current corresponding to the accumulated charge flows. That is, a dotted line a in FIG. 5 represents the waveform of the current flowing to the LED 11 when the reference voltage generated by the current control voltage supplying DAC 36 is supplied from the switch 64 to the comparator 34.

On the other hand, when the controlled voltage generated by the PWM control voltage supplying DAC 63 is supplied from the switch 64 to the comparator 34, the FET 12 is on for a period t1' on the basis of the value of the controlled voltage generated on the basis of the m-bit control signal. For example, when m=8, the length of the period t1' determined by the value of the controlled voltage is controlled in 256 gradations. Then, in a period t2' in which the FET 12 is off, the charge accumulated in the reactance 13 is discharged, and the diode 15 acts to generate a current I2. Thus the current corresponding to the accumulated charge flows. That is, alternate long and short dashed lines b in FIG. 5 represents the waveform of the current flowing to the LED 11 when the controlled voltage generated by the PWM control voltage supplying DAC 63 is supplied from the switch 64 to the comparator 34. A power supplied to the LED 11 in this one step is the integral value of the alternate long and short dashed lines in FIG. 5.

By thus supplying the controlled voltage value controlled by the m bits from the PWM control voltage supplying DAC 63 to the comparator 34 at one last pulse for turning on the FET 12 which last pulse is determined by the control value of the n higher-order bits, the LED driving current in the buck converter circuit at the one pulse can be controlled with a resolution of m bits.

Figure 6:
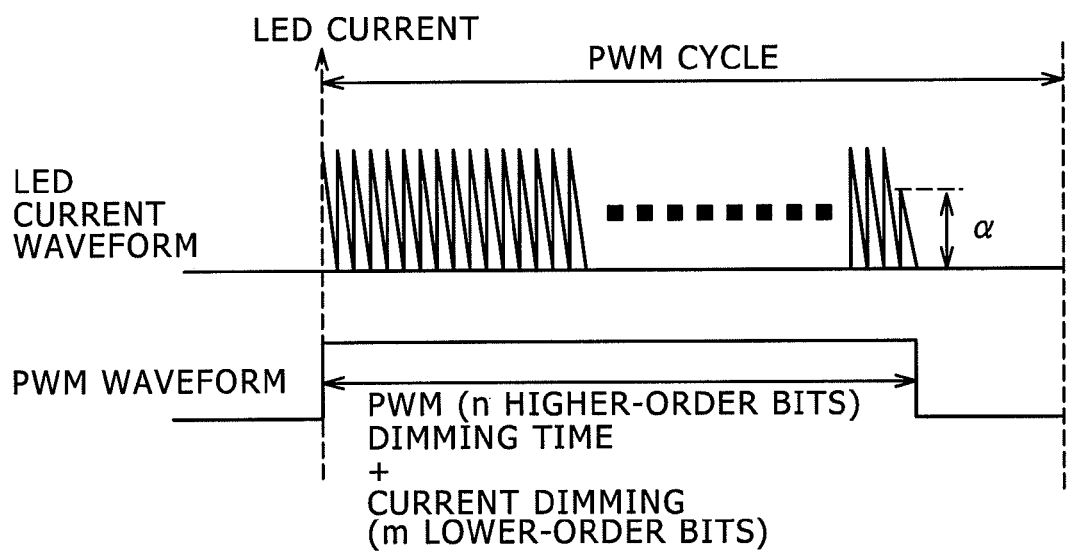
FIG. 6 is a diagram of assistance in explaining an ON duty of PWM control and current control in the LED driving circuit of FIG. 4.

That is, as shown by an LED current waveform in FIG. 6, in the LED driving circuit 51, the number of times that the FET 12 is turned on within a PWM cycle which number can be controlled by the n bits is determined by the n higher-order bits of the control value of the (n+m) bits, and current dimming by a current value determined by the m lower-order bits of the control value is performed at the one last pulse for turning on the FET 12.

Incidentally, it is needless to say that the LED driving circuit 51 can perform the m-bit current control at any one pulse other than the one last pulse within an ON interval determined by the control value of the n higher-order bits in one PWM cycle.

Thus, the LED driving circuit 51 can perform current control having a gradation accuracy of m bits on the basis of the controlled voltage value supplied from the PWM control voltage supplying DAC 63 in addition to a gradation accuracy of n bits in the control of the brightness controlling PWM 62. The brightness of the LED 11 can therefore have a control accuracy of (n+m) bits, that is, a gradation accuracy of n×m gradations.

In addition, while the LED driving circuit 51 can perform LED power control with a control accuracy of (n+m) bits, one PWM cycle is a value obtained by multiplying the fundamental period of the buck converter by two raised to an nth power (fundamental period×n bits). This PWM cycle is shortened by a value obtained by multiplying the fundamental period of the buck converter by two raised to an mth power as compared with a case where PWM bit gradations are simply increased to (n+m) for higher PWM control accuracy. That is, the LED driving circuit 51 can perform PWM control at a gradation accuracy of n×m gradations with the same number of steps as in the case in related art where PWM control is performed with a gradation accuracy of n bits. Thus, the accuracy of PWM control in the LED driving circuit 51 can be increased without control responsivity being impaired and without the switching frequency of the buck converter being set high.

In other words, the LED driving circuit 51 can perform the current control of the buck converter with the number of gradations for higher accuracy than in the case in related art in a PWM cycle equal to that of the case in related art and at a switching speed of the buck converter which switching speed is equal to that of the case in related art.

Incidentally, while the LED driving circuit 51 has been described with reference to FIG. 4 supposing that the brightness controlling PWM 62 controls the switch 64, the similar brightness controlling PWM 32 as in the case in related art may be provided as brightness controlling PWM, and the switch 64 may be controlled by a different block.

In addition, the LED driving circuit 51 has been described with reference to FIG. 4 supposing that the PWM control voltage supplying DAC 63 sets the controlled voltage value different from the reference voltage generated by the current control voltage supplying DAC 36 on the basis of the m-bit PWM adjustment value supplied from the PWM adjustment value obtaining unit 61, and then supplies the controlled voltage value to the switch 64. However, for example, without the PWM control voltage supplying DAC 63 and the switch 64 being provided, the m-bit PWM adjustment value supplied from the PWM adjustment value obtaining unit 61 may be supplied to a current control voltage supplying DAC provided as one DAC and the control signal that controls the switching of the switch 64 may also be supplied to the current control voltage supplying DAC so that the current control voltage supplying DAC selects the value of the reference voltage or the controlled voltage value which values are the same as in the above-described case and then supplies the value to the comparator 34.

However, switching between the outputs of two DACs (the PWM control voltage supplying DAC 63 and the current control voltage supplying DAC 36 in this case) using a switch is superior in responsivity for performing high-speed control to changing the output value of one DAC at high speed on the basis of certain timing, and is thus more suitable.

As described above, the LED driving circuit 51 described with reference to FIG. 4 can control the buck converter with a gradation of (n+m) bits by controlling the number of times that the FET 12 is turned on in one PWM cycle by the n higher-order bits and controlling the voltage value for comparison which value is supplied to the comparator 34 by the m bits at one of the times that the FET 12 is turned on.

Incidentally, the LED varies in light emission wavelength depending on the current value. In the LED driving circuit 51, however, because the current control of one pulse is performed in one PWM cycle with n bits, a degree of effect of the variation in light emission wavelength is relatively small and does not present a problem.

A control process performed in the LED driving circuit 51 will next be described with reference to a flowchart of FIG. 7.

In step S1, the PWM adjustment value obtaining unit 61 obtains a PWM adjustment value of (n+m) bits from an operating input unit not shown in the figures or an external device or the like. The PWM adjustment value obtaining unit 61 then supplies the n higher-order bits to the brightness controlling PWM 62 and supplies the m lower-order bits to the PWM control voltage supplying DAC 63. At this time, the brightness controlling PWM 62 controls the switch 64 to supply the reference voltage as the output value of the current control voltage supplying DAC (Current DAC) 36 to the comparator 34.

In step S2, the brightness controlling PWM 62 supplies an ON signal (1) to the logic circuit 37, and starts counting the number of generated pulses corresponding to the control value of the n higher-order bits.

In step S3, the brightness controlling PWM 62 determines whether the number of generated pulses corresponding to the control value of the n higher-order bits has reached a predetermined value.

When the brightness controlling PWM 62 determines in step S3 that the number of generated pulses corresponding to the control value of the n higher-order bits has not reached the predetermined value, the brightness controlling PWM 62 in step S4 controls the switch 64 to maintain the supply of the reference voltage as the output value of the current control voltage supplying DAC (Current DAC) 36 to the comparator 34. The process returns to step S3 to repeat the process from step S3 on down.

When the process of step S4 is performed, the comparator 34 compares the value of voltage occurring across the resistance 21 with the reference voltage generated by the current control voltage supplying DAC 36, and supplies a result of the comparison to the current controlling PWM 31. The current controlling PWM 31 turns on the FET 12 at the time of a start of one switching cycle. The current controlling PWM 31 maintains the ON state of the FET 12 while the value of the voltage occurring across the resistance 21 is lower than the reference voltage. The current controlling PWM 31 turns off the FET 12 when the value of the voltage occurring across the resistance 21 becomes higher than the reference voltage. That is, the dotted line a in FIG. 5 represents the waveform of current supplied to the LED 11 when the process of step S4 is performed.

When the brightness controlling PWM 62 determines in step S3 that the number of generated pulses corresponding to the control value of the n higher-order bits has reached the predetermined value, the brightness controlling PWM 62 in step S5 controls the switch 64 to supply the controlled voltage value as an output value corresponding to the control value of the m lower-order bits from the PWM control voltage supplying DAC (PWM DAC) 63 to the comparator 34.

When the process of step S5 is performed, the comparator 34 compares the value of voltage occurring across the resistance 21 with the controlled voltage generated by the PWM control voltage supplying DAC 63, and supplies a result of the comparison to the current controlling PWM 31. The current controlling PWM 31 controls the FET 12 to turn on the FET 12 at the time of a start of one switching cycle. The current controlling PWM 31 maintains the ON state of the FET 12 while the value of the voltage occurring across the resistance 21 is lower than the controlled voltage. The current controlling PWM 31 controls the FET 12 to turn off the FET 12 when the value of the voltage occurring across the resistance 21 becomes higher than the controlled voltage. That is, the alternate long and short dashed lines b in FIG. 5 represents the waveform of current supplied to the LED 11 when the process of step S5 is performed.

After the current represented by the alternate long and short dashed lines b in FIG. 5 is generated by one pulse in step S5, the brightness controlling PWM 62 supplies an OFF signal (0) to the logic circuit 37 because the number of generated pulses corresponding to the control value of the n higher-order bits has reached the predetermined value.

Then, in step S6, the brightness controlling PWM 62 determines whether one PWM cycle has passed.

When the brightness controlling PWM 62 determines in step S6 that one PWM cycle has not passed, the process of step S6 is repeated until the brightness controlling PWM 62 determines that one PWM cycle has passed. That is, while the process of step S6 is performed, the brightness controlling PWM 62 supplies the OFF signal (0) to the logic circuit 37, and thus the OFF state of the FET 12 is maintained.

Incidentally, whereas the switch 64 is controlled to supply the output from the PWM control voltage supplying DAC 63 to the comparator 34 in step S5, the brightness controlling PWM 62 controls the switch 64 to supply the reference voltage as the output value of the current control voltage supplying DAC 36 to the comparator 34 during a period before the brightness controlling PWM 62 determines in step S6 that one PWM cycle has passed.

When the brightness controlling PWM 62 determines in step S6 that one PWM cycle has passed, the process returns to step S1 to repeat the process from step S1 on down.

By such a process, the LED driving circuit 51 can perform the power control of the buck converter with the number of gradations for higher accuracy than in the case in related art in a PWM cycle equal to that of the case in related art and at a switching speed of the buck converter which switching speed is equal to that of the case in related art.

That is, the LED driving circuit 51 is controlled on the basis of a PWM cycle having an integral multiple of (n-bit times) the switching cycle of the buck converter as a unit, the switching cycle of the buck converter and the PWM cycle are synchronized with each other, and power control is performed by m bits at one of pulses generated during the ON period of PWM control. It is thus possible to suppress unwanted radiation due to switching noise without impairing responsivity, and control the brightness of the LED 11 with a gradation of (n+m) bits.

Such an LED driving circuit 51 is suitable for use in LED brightness control of an LCD (Liquid Crystal Display) unit having the LED 11 as a backlight light source used in a television receiver, for example. In particular, such an LED driving circuit 51 is suitable as means for controlling the brightness of each LED because the LED driving circuit 51 does not lower the control speed of brightness control, does not cause variations in light emission wavelength of the LED, and prevents occurrence of unwanted radiation due to switching noise.

In particular, in a case where an LED used as a backlight in a display device such as a television receiver or the like is desired to be controlled with high accuracy, for example a case where each frame of an image to be displayed is divided into a plurality of areas, a display brightness necessary for each area is calculated from the brightness distribution of each frame, and the brightness of a plurality of backlight light sources provided in each area is controlled, such an LED driving circuit 51 is suitable in controlling the brightness of LEDs as backlight light sources in each area with high accuracy.

FIG. 8 shows an example of configuration of an embodiment of a liquid crystal display device to which the above-described LED driving circuit 51 is suitably applied.

A liquid crystal display device 101 in FIG. 8 includes: a liquid crystal panel 111 having a color filter substrate colored red, green, and blue, a liquid crystal layer, and the like; a backlight 112 disposed on the back side of the liquid crystal panel 111; a control unit 113 for controlling the liquid crystal panel 111 and the backlight 112; and a power supply unit 114.

The liquid crystal display device 101 displays an original image corresponding to an image signal in a predetermined display area (an area corresponding to a display unit 121 of the liquid crystal panel 111). Incidentally, the input image signal input to the liquid crystal display device 101 corresponds to an image at a frame rate of 60 Hz, for example (which image will hereinafter be referred to as a frame image).

The liquid crystal panel 111 includes: a display unit 121 in which a plurality of opening parts for transmitting white light from the backlight 112 are arranged; and a source driver 122 and a gate driver 123 for sending a driving signal to a transistor (TFT: Thin Film Transistor) not shown in the figure which transistor is provided for each of the opening parts of the display unit 121.

The white light that has passed through the opening parts of the display unit 121 is converted into red, green, or blue light by a color filter formed on the color filter substrate not shown in the figure. A set of three opening parts emitting red, green, and blue light corresponds to one pixel of the display unit 121.

The backlight 112 emits white light in a light emitting area corresponding to the display unit 121. As shown in FIG. 8, the light emitting area of the backlight 112 is divided into a plurality of blocks (areas) BL. Lighting in each of the plurality of divided blocks BL is controlled individually.

One or more LEDs (corresponding to the LED 11 in FIG. 4) as a light emitting element emitting red light, one or more LEDs as a light emitting element emitting green light, and one or more LEDs as a light emitting element emitting blue light are arranged in each block BL. The whole of the red, green, and blue LEDs arranged within each block BL forms a light source LT. The light source LT emits white light by mixing red light, green light, and blue light with each other.

Incidentally, while FIG. 8 shows an example in which the backlight 112 is divided into 24 blocks BL, the number of divided blocks BL is not limited to this. In addition, blocks BL are obtained by virtually dividing the light emitting area of the backlight 112 rather than physically dividing the light emitting area of the backlight 112 by partition plates or the like. Thus, light emitted from a light emitting element disposed within a block BL is diffused by a diffuser not shown in the figure to irradiate not only the front of the block BL but also the front of surrounding blocks.

The control unit 113 includes a display brightness calculating unit 131, a light source controlling unit 132, and a liquid crystal panel controlling unit 133. The light source controlling unit 132 of the control unit 113 forms a backlight device together with the backlight 112.

The display brightness calculating unit 131 is supplied with an image signal corresponding to each frame image from another device. The display brightness calculating unit 131 determines the brightness distribution of a frame image from the supplied image signal, and further calculates a necessary display brightness for each block BL from the brightness distribution of the frame image. The calculated display brightness is supplied to the light source controlling unit 132 and the liquid crystal panel controlling unit 133.

The light source controlling unit 132 calculates a light emission brightness for each block BL on the basis of the display brightness of each block BL which display brightness is supplied from the display brightness calculating unit 131. Then, the light source controlling unit 132 variably controls the light source LT of each block BL of the backlight 112 so as to attain the calculated light emission brightness. The liquid crystal display device 101 thus performs backlight divided control in which the light emission brightness of each block BL is adaptively controlled according to the brightness distribution of the frame image. Incidentally, information indicating a value at which the light emission brightness of each block BL is set is supplied to the liquid crystal panel controlling unit 133. For adjustment of the light emission brightness, PWM driving control is adopted which control is performed by changing the pulse width of a pulse signal as described above.

The light source controlling unit 132 also adjusts the whiteness level (white balance) of light formed by a mixture of red light, green light, and blue light on the basis of a received light signal from a color sensor for each of R, G, and B which sensor is disposed within each block BL of the backlight 112.

The liquid crystal panel controlling unit 133 calculates a liquid crystal aperture ratio of each pixel of the display unit 121 on the basis of the display brightness of each block BL which display brightness is supplied from the display brightness calculating unit 131 and the light emission brightness of each block BL which light emission brightness is supplied from the light source controlling unit 132. Then, the liquid crystal panel controlling unit 133 supplies a driving signal to the source driver 122 and the gate driver 123 of the liquid crystal panel 111 to drive and control a TFT in each pixel of the display unit 121 so as to attain the calculated liquid crystal aperture ratio.

The power supply unit 114 supplies predetermined power to each part of the liquid crystal display device 101.

Such a liquid crystal display device 101 needs to accurately control the backlight light emission brightness of each block BL. Accordingly, the above-described LED driving circuit 51 is suitably applied to the light source controlling unit 132 because the LED driving circuit 51 makes it possible to control the brightness of each LED with high accuracy without lowering the control speed of brightness control, without causing variations in light emission wavelength of the LED, and while preventing occurrence of unwanted radiation due to switching noise.

Incidentally, it is needless to say that the LED driving circuit 51 can drive an LED other than in the backlight of a liquid crystal display device.

In addition, with a circuit configuration similar to that of the LED driving circuit 51, the number of gradations of PWM control for controlling a buck converter can be increased, and therefore the accuracy of the PWM control can be enhanced without impairing responsivity. That is, a circuit configuration similar to that of the LED driving circuit 51 can drive a load other than an LED.

It is to be noted that embodiments of the present invention are not limited to the above-described embodiments, and that various changes can be made without departing from the spirit of the present invention.

What is claimed is:

1. A control device for controlling driving of an LED, said control device comprising:
    driving means for driving said LED, said driving means being formed including a switching element;
    control value obtaining means for obtaining a control value of n+m bits; and
    controlling means for controlling the driving of said LED by said driving means on a basis of the control value of the n+m bits obtained by said control value obtaining means such that a number of times of turning on said switching element in a predetermined period is controlled by a control value of n higher-order bits, an ON time at one of the times of turning on said switching element is controlled by a control value of m lower-order bits, and ON times of said switching element excluding the ON time at the one time of turning on said switching element are a predetermined time.

2. The control device according to claim 1, wherein said controlling means further includes:
    first ON signal generating means for generating an ON signal at a duty ratio based on the control value of the n higher-order bits of the control value of the n+m bits obtained by said control value obtaining means, with said predetermined time as one cycle;
    detecting means for detecting a value of current flowing through said LED;
    comparing means for comparing a result of detection by said detecting means with a predetermined value;
    second ON signal generating means for generating an ON signal for a period from a start of a switching cycle of said switching element to a time when the value of current flowing through said LED reaches a current value determined by said predetermined value on a basis of a result of comparison by said comparing means; and
    switching element controlling means for supplying an ON signal to said switching element when said first ON signal generating means and said second ON signal generating means are both generating the ON signals, and
    said predetermined value compared by said comparing means with the result of detection by said detecting means is a controlled value controlled by the m lower-order bits in timing corresponding to one of the times of turning on said switching element the number of which times is controlled by the n higher-order bits, and is a reference value in timings corresponding to the other times of turning on said switching element.

3. The control device according to claim 2, wherein said controlling means further includes:
   controlled value supplying means for supplying said controlled value controlled by the m lower-order bits as said predetermined value to be compared by said comparing means with the result of detection by said detecting means;
   reference value supplying means for supplying said reference value as said predetermined value to be compared by said comparing means with the result of detection by said detecting means; and
   selecting means for selecting one of said controlled value supplied by said controlled value supplying means and said reference value supplied by said reference value supplying means as a value to be supplied to said comparing means, and
   said selecting means supplies said controlled value supplied by said controlled value supplying means to said comparing means in timing corresponding to one of the times of turning on said switching element the number of which times is controlled by the n higher-order bits, and supplies said reference value supplied by said reference value supplying means to said comparing means in timings corresponding to the other times of turning on said switching element.

4. The control device according to claim 1, wherein said predetermined time is a time corresponding to the n bits of switching cycles of said switching element.

5. A control method of a control device for controlling driving of an LED, said control method comprising the steps of:
   obtaining a control value of n+m bits;
   controlling a number of times of turning on a switching element included in a driving circuit for driving said LED in a predetermined period by a control value of n higher-order bits of the obtained control value of the n+m bits; and
   controlling an ON time at one of the times of turning on said switching element by a control value of m lower-order bits, and performing control such that ON times of said switching element excluding the ON time at the one time of turning on said switching element are a predetermined time.

6. A planar light source device for emitting light by LED, said planar light source device comprising:
   an LED;
   driving means for driving said LED, said driving means being formed including a switching element;
   control value obtaining means for obtaining a control value of n+m bits; and
   controlling means for controlling the driving of said LED by said driving means on a basis of the control value of the n+m bits obtained by said control value obtaining means such that a number of times of turning on said switching element in a predetermined period is controlled by a control value of n higher-order bits, an ON time at one of the times of turning on said switching element is controlled by a control value of m lower-order bits, and ON times of said switching element excluding the ON time at the one time of turning on said switching element are a predetermined time.

7. The planar light source device according to claim 6, wherein
   a plurality of said LEDs, a plurality of said driving means, a plurality of said control value obtaining means, and a plurality of said controlling means are provided,
   said LEDs are arranged in a planar form, and
   the plurality of said controlling means obtain different control values by the plurality of said control value obtaining means, and control the driving of said LEDs by said driving means on a basis of the different control values so as to make the plurality of said LEDs emit light at different brightness levels.

8. A control method of a planar light source for emitting light by LED, said control method comprising the steps of:
   obtaining a control value of n+m bits;
   controlling a number of times of turning on a switching element included in a driving circuit for driving said LED in a predetermined period by a control value of n higher-order bits of the obtained control value of the n+m bits; and
   controlling an ON time at one of the times of turning on said switching element by a control value of m lower-order bits, and performing control such that ON times of said switching element excluding the ON time at the one time of turning on said switching element are a predetermined time.

9. A liquid crystal display device comprising:
   a liquid crystal panel having a color filter substrate and a liquid crystal layer;
   a backlight having an LED, said backlight being disposed so as to be opposed to said liquid crystal panel; and
   a control device for controlling said backlight,
   wherein said control device includes
      driving means for driving said LED, said driving means being formed including a switching element,
      control value obtaining means for obtaining a control value of n+m bits, and
      controlling means for controlling the driving of said LED by said driving means on a basis of the control value of the n+m bits obtained by said control value obtaining means such that a number of times of turning on said switching element in a predetermined period is controlled by a control value of n higher-order bits, an ON time at one of the times of turning on said switching element is controlled by a control value of m lower-order bits, and ON times of said switching element excluding the ON time at the one time of turning on said switching element are a predetermined time.

10. The liquid crystal display device according to claim 9, wherein
    said controlling means further includes:
       first ON signal generating means for generating an ON signal at a duty ratio based on the control value of the n higher-order bits of the control value of the n+m bits obtained by said control value obtaining means, with said predetermined time as one cycle;
       detecting means for detecting a value of current flowing through said LED;
       comparing means for comparing a result of detection by said detecting means with a predetermined value;
       second ON signal generating means for generating an ON signal for a period from a start of a switching cycle of said switching element to a time when the value of current flowing through said LED reaches a current value determined by said predetermined value on a basis of a result of comparison by said comparing means; and switching element controlling means for supplying an ON signal to said switching element when said first ON signal generating means and said second ON signal generating means are both generating the ON signals, and said predetermined value compared by said comparing means with the result of detection by said detecting means is a controlled value controlled by the m lower-order bits in timing corresponding to one of the times of turning on said switching element the number of which times is controlled by the n higher-order bits, and is a reference value in timings corresponding to the other times of turning on said switching element.

11. The liquid crystal display device according to claim 9, wherein said controlling means further includes:

controlled value supplying means for supplying said controlled value controlled by the m lower-order bits as said predetermined value to be compared by said comparing means with the result of detection by said detecting means;

reference value supplying means for supplying said reference value as said predetermined value to be compared by said comparing means with the result of detection by said detecting means; and selecting means for selecting one of said controlled value supplied by said controlled value supplying means and said reference value supplied by said reference value supplying means as a value to be supplied to said comparing means, and said selecting means supplies said controlled value supplied by said controlled value supplying means to said comparing means in timing corresponding to one of the times of turning on said switching element the number of which times is controlled by the n higher-order bits, and supplies said reference value supplied by said reference value supplying means to said comparing means in timings corresponding to the other times of turning on said switching element.

12. The liquid crystal display device according to claim 9, wherein said predetermined time is a time corresponding to the n bits of switching cycles of said switching element.

13. A control device for controlling driving of an LED, said control device comprising:

a driving section driving said LED, said driving section being formed including a switching element;

a control value obtaining section obtaining a control value of n+m bits; and a controlling section controlling the driving of said LED by said driving section on a basis of the control value of the n+m bits obtained by said control value obtaining section such that a number of times of turning on said switching element in a predetermined period is controlled by a control value of n higher-order bits, an ON time at one of the times of turning on said switching element is controlled by a control value of m lower-order bits, and ON times of said switching element excluding the ON time at the one time of turning on said switching element are a predetermined time.

* * * * *